(12) United States Patent
Su et al.

(10) Patent No.: US 11,776,521 B2
(45) Date of Patent: *Oct. 3, 2023

(54) SOUND ABSORBING STRUCTURE HAVING ONE OR MORE ACOUSTIC SCATTERERS ATTACHED TO OR FORMING A VEHICLE STRUCTURE

(71) Applicants: Toyota Motor Engineering & Manufacturing North America, Inc., Plano, TX (US); Toyota Jidosha Kabushiki Kaisha, Toyota (JP)

(72) Inventors: Xiaoshi Su, Ann Arbor, MI (US); Debasish Banerjee, Ann Arbor, MI (US); Kai Aizawa, Toyota (JP); Steven R. Sorenson, Ypsilanti, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 284 days.

This patent is subject to a terminal disclaimer.

(21) Appl. No.: 17/172,322

(22) Filed: Feb. 10, 2021

(65) Prior Publication Data

US 2022/0189446 A1  Jun. 16, 2022

Related U.S. Application Data

(60) Provisional application No. 63/124,269, filed on Dec. 11, 2020.

(51) Int. Cl.
*G10K 11/172* (2006.01)
*B60R 13/08* (2006.01)

(52) U.S. Cl.
CPC ........ *G10K 11/172* (2013.01); *B60R 13/0861* (2013.01); *B60R 13/0884* (2013.01)

(58) Field of Classification Search
CPC . B60R 13/0861; B60R 13/0884; B60R 13/08; B60R 13/0815; B60R 13/0823;
(Continued)

(56) References Cited

U.S. PATENT DOCUMENTS 2,677,571 A * 5/1954 Albert ................. B60P 3/32
    280/789
5,952,625 A * 9/1999 Huff .................... F01N 1/06
    181/266
(Continued)

FOREIGN PATENT DOCUMENTS

JP  62126215 A  *  6/1987

OTHER PUBLICATIONS

English translation of JP-62126215-A, accessed Jan. 13, 2022 via USPTO Search tool (Year: 1987).*

(Continued)

*Primary Examiner* — Jeremy A Luks
(74) *Attorney, Agent, or Firm* — Christopher G. Darrow; DARROW MUSTAFA PC

(57) ABSTRACT

A sound absorbing structure includes a vehicle structure having a surface and at least one acoustic scatterer coupled to the surface. The at least one acoustic scatterer has a resonant frequency. The at least one acoustic scatterer has an opening and at least one channel. The at least one channel has a channel open end and a channel terminal end, the channel open end being in fluid communication with the opening. The sound absorbing structure may be configured to absorb sound waves at a certain frequency generated by a noise source. The certain frequency may be substantially similar to the resonant frequency of the at least one acoustic scatterer.

20 Claims, 5 Drawing Sheets

(58) Field of Classification Search
CPC . B60R 13/083; B60R 13/0838; G10K 11/172; G10K 11/162; F01N 1/02; F01N 1/12; F16L 55/033
See application file for complete search history.

(56) References Cited

U.S. PATENT DOCUMENTS

| | | | |
|---|---|---|---|
| 6,719,078 B2 | 4/2004 | Nakamura | |
| 6,892,856 B2* | 5/2005 | Takahashi | G10K 11/172 |
| | | | 181/284 |
| 6,988,057 B2 | 1/2006 | Huang et al. | |
| 7,464,790 B2* | 12/2008 | Kodama | G10K 11/172 |
| | | | 181/290 |
| 7,520,370 B2* | 4/2009 | Gudim | E04B 1/8209 |
| | | | 181/290 |
| 7,540,353 B2 | 6/2009 | Okawa et al. | |
| 8,011,472 B2* | 9/2011 | Tanase | G10K 11/172 |
| | | | 181/290 |
| 8,157,052 B2* | 4/2012 | Fujimori | G10K 11/175 |
| | | | 181/295 |
| 8,714,303 B2* | 5/2014 | Honji | G10K 11/175 |
| | | | 181/284 |
| 8,919,491 B2* | 12/2014 | Trumler | F02M 35/1266 |
| | | | 181/227 |
| 9,291,104 B2* | 3/2016 | Ito | F23M 20/005 |
| 9,607,600 B2* | 3/2017 | Swallowe | G10K 11/172 |
| 9,765,516 B2* | 9/2017 | Van Dinther | E04B 1/8209 |
| 10,352,210 B2 | 7/2019 | Hanschen et al. | |
| 11,043,199 B2* | 6/2021 | Lee | G10K 11/172 |
| 11,545,128 B2* | 1/2023 | Su | G10K 11/162 |
| 11,555,280 B2* | 1/2023 | Su | E01F 8/0047 |
| 2005/0098379 A1* | 5/2005 | Sato | B60R 13/0815 |
| | | | 181/295 |
| 2013/0307290 A1* | 11/2013 | Ide | B60R 13/08 |
| | | | 181/176 |
| 2017/0263235 A1* | 9/2017 | Elford | G10K 11/172 |
| 2018/0114517 A1* | 4/2018 | Yamazoe | E04B 1/994 |
| 2019/0139529 A1 | 5/2019 | Viard et al. | |
| 2019/0206380 A1* | 7/2019 | Hakuta | G10K 11/162 |
| 2020/0224810 A1* | 7/2020 | Hakuta | F24F 13/02 |
| 2020/0284174 A1* | 9/2020 | Lee | F01N 1/023 |
| 2021/0010977 A1* | 1/2021 | Lee | G01N 21/1702 |

OTHER PUBLICATIONS

Long et al., "Multiband quasi-perfect low-frequency sound absorber based on double-channel Mie resonator," Appl. Phys. Lett. 112, 033507, 7 pages (2018).

Lee et al., "Ultrasparse acoustic absorbers enabling fluid flow and visible-light controls." Physical Review Applied 11.2 (2019): 024022, 13 pages.

Cheng et al., "Ultra-sparse metasurface for high reflection of low frequency sound based on artificial Mie resonances," Nat. Mater. 14, 8 pages (2015).

Schwan et al., "Sound absorption and reflection from a resonant metasurface: Homogenisation model with experimental validation," Wave Motion 72 (2017) 154-172.

Ghaffarivardavagh et al., "Ultra-open acoustic metamaterial silencer based on Fano-like interference," Phys. Rev. B 99, 024302, 10 pages (2019).

* cited by examiner

SOUND ABSORBING STRUCTURE HAVING ONE OR MORE ACOUSTIC SCATTERERS ATTACHED TO OR FORMING A VEHICLE STRUCTURE

CROSS-REFERENCE TO RELATED APPLICATION

This application claims the benefit of U.S. Provisional Patent Application No. 63/124,269, entitled "SOUND ABSORBING STRUCTURE HAVING ONE OR MORE ACOUSTIC SCATTERERS ATTACHED TO OR FORMING A VEHICLE STRUCTURE," filed Dec. 11, 2020, which is incorporated by reference herein in its entirety.

TECHNICAL FIELD

The present disclosure relates to sound absorbing structures that absorb sound and improve sound transmission loss and, more specifically, to sound absorbing structures that include one or more scatterers attached to, or forming part of, a vehicle structure.

BACKGROUND

The background description provided is to present the context of the disclosure generally. Work of the inventors, to the extent it may be described in this background section, and aspects of the description that may not otherwise qualify as prior art at the time of filing, are neither expressly nor impliedly admitted as prior art against the present technology.

Low-frequency noise-related issues are common in a variety of different environments. For example, noise generated from rapidly moving traffic on a highway, the takeoff and landing of large airplanes at an airport, rail freight movement, and the like create significant amounts of low-frequency noise. There are several different solutions for managing low-frequency noises, but many have drawbacks. For example, conventional porous sound absorbing materials are only efficient for high-frequency noise reduction due to its high impedance nature. The sound transmission through porous materials is high if the material microstructure has a large porosity.

Additionally, the sound isolation performance using these materials is limited by the so-called "mass-law." The "mass-law" states that doubling the mass per unit area increases the sound transmission loss ("STL") by six decibels. Similarly, doubling the frequency increases the STL by six decibels. This effect makes it difficult to isolate low-frequency sound using lightweight materials. In order to achieve high STL, one may either reflect or absorb the sound energy. However, achieving high absorption and high STL simultaneously is also difficult because high absorption usually requires impedance matching, leading to high transmission.

SUMMARY

This section generally summarizes the disclosure and is not a comprehensive disclosure of its full scope or all its features.

Examples of sound absorbing structures include a vehicle structure having a surface and at least one acoustic scatterer coupled to the surface. The at least one acoustic scatterer has a resonant frequency. The at least one acoustic scatterer has an opening and at least one channel. The at least one channel has a channel open end and a channel terminal end, with the channel open end being in fluid communication with the opening. The sound absorbing structure may be configured to absorb sound waves at a certain frequency generated by a noise source. The certain frequency may be substantially similar to the resonant frequency of the at least one acoustic scatterer.

The at least one acoustic scatterer may include a first channel and a second channel. The first channel may have a first channel open end and a first channel terminal end, with the first channel open end being in fluid communication with the opening. The second channel may have a second channel open end and a second channel terminal end, with the second channel open end being in fluid communication with the opening.

In another example, a vehicle structure may include a first panel and a second panel that defines a space between the first panel and the second panel. At least one acoustic scatterer, having a resonant frequency, may be attached to a side of the first panel and located in the space between the first panel and the second panel. Like before, the at least one acoustic scatterer has an opening and at least one channel. The at least one channel has a channel open end and a channel terminal end, the channel open end being in fluid communication with the opening. The sound absorbing structure may be configured to absorb sound waves at a certain frequency generated by a noise source. The certain frequency may be substantially similar to the resonant frequency of the at least one acoustic scatterer.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The present teachings will become more fully understood from the detailed description and the accompanying drawings, wherein.

Figure 1:
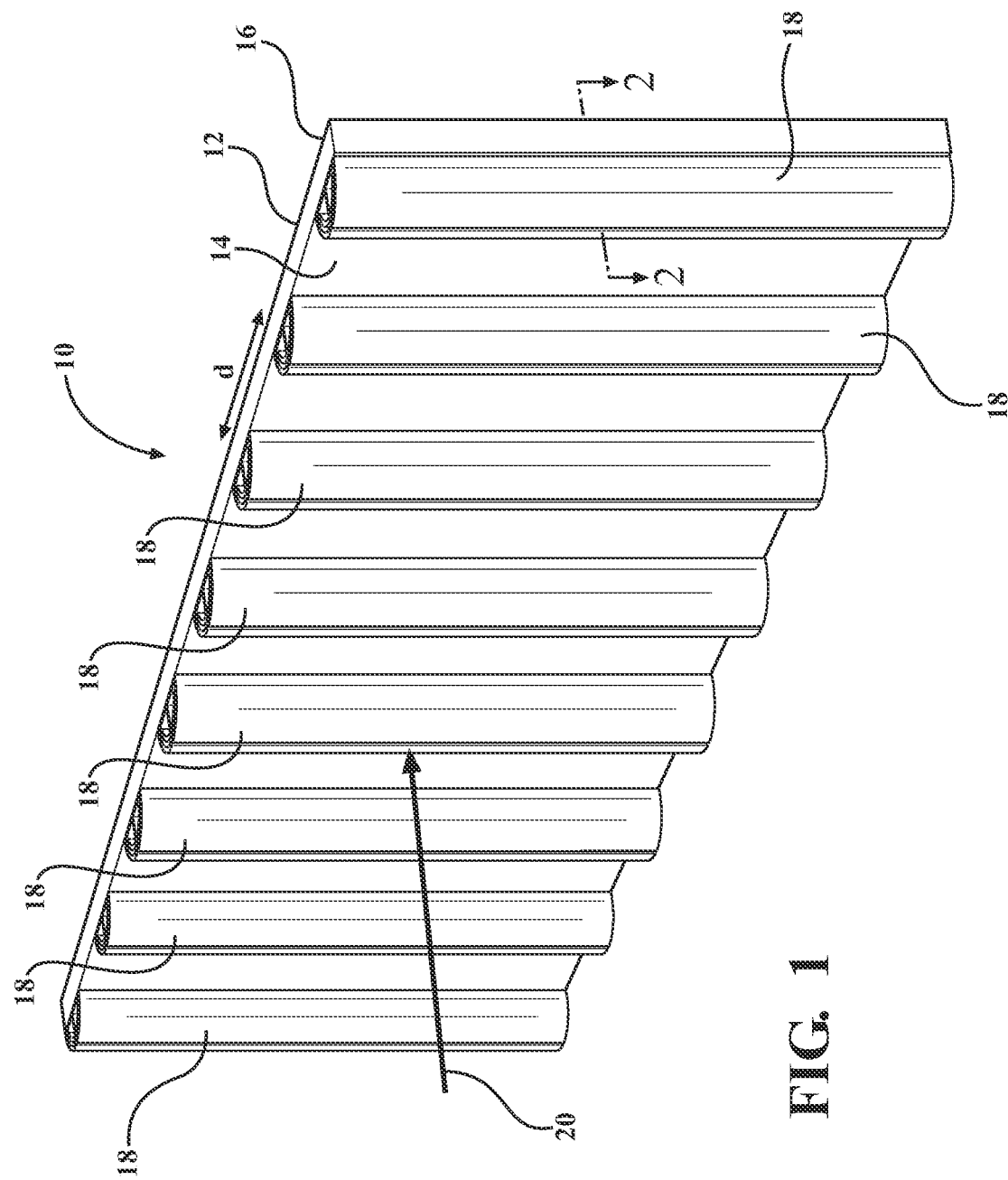
FIG. 1 illustrates a sound absorbing structure for absorbing sound and improving sound transmission loss utilizing a plurality of acoustic scatterers mounted to a vehicle structure.

The figures set forth herein are intended to exemplify the general characteristics of the methods, algorithms, and devices among those of the present technology for the purpose of the description of certain aspects. These figures may not precisely reflect the characteristics of any given aspect and are not necessarily intended to define or limit specific embodiments within the scope of this technology. Further, certain aspects may incorporate features from a combination of figures.

DETAILED DESCRIPTION

The present teachings provide a sound absorbing structure that may include an array of acoustic scatterers, which may be referred to as half scatterers, coupled to, or being part of, a vehicle structure arrangement that may achieve high STL beyond the "mass-law" and total acoustic absorption at the same time. Generally, the vehicle structure includes at least one surface that allows for the mounting of one or more acoustic scatterers. The surface of the vehicle structure may be an acoustically hard surface. The vehicle structure can be any structure of the vehicle that has a surface that is acoustically hard. As such, the vehicle structure could include a vehicle panel, such as a door panel, floor pan, roof, interior trim piece, bodywork located near a wheel well, one or more pillars of the vehicle, intake/exhaust ducts, and/or mufflers, and the like. The previously provided examples given of the vehicle structure are merely examples and are not limited to just these examples provided.

The sound absorbing structure described in this disclosure may achieve high sound absorption and yet, at the same time, be relatively thin. Moreover, in one example, the sound absorbing structure may have a thickness of only $\frac{1}{16}$ of the wavelength and can achieve total acoustic absorption. In addition, the sound absorbing structure can essentially break the "mass-law" near the resonant frequency of the acoustic scatterer. At the resonant frequency, the effective mass density of the sound absorbing structure becomes negative so that the sound speed and the wavenumber in the material become imaginary. The imaginary wavenumber indicates that the wave is exponentially decaying in the material. Also, the impedance of the material is matched to air at the same frequency so that there is no reflection. As a result, all the energy may be absorbed, and hence the STL is higher than the mass-law within a certain frequency band.

Moreover, the sound projected to the sound absorbing structure is partially reflected by the vehicle structure's surface without a phase change. The acoustic scatterer behaves like a monopole source at a certain distance from the panel, and its mirror image radiates a monopole moment as well. The two monopoles form a new plane wave having a direct reflection from the panel with a 180° phase difference. As such, the wave reflected by the surface of the vehicle structure is essentially canceled out by the new plane wave, thus absorbing the projected sound.

Referring to FIG. 1, a sound absorbing structure 10 is shown. The sound absorbing structure includes a vehicle structure 12 having a first surface 14 and a second surface 16. Generally, the first surface 14 of the vehicle structure 12 may be made of an acoustically hard material, such as glass, metal, plastic, or any acoustically hard material. As stated previously, the vehicle structure can be any structure of the vehicle with an acoustically hard surface. As such, the vehicle structure could include a vehicle panel, floor pan, roof, interior trim piece, bodywork located near a wheel well, one or more pillars of the vehicle, intake/exhaust ducts and/or mufflers, and the like.

Additionally, the term vehicle could include any form of powered transport that can transport persons or items from one location to another. As such, the vehicle could include things such as automobiles, trucks, sport utility vehicles, crossover utility vehicles, farm equipment, mining vehicles, tracked vehicles, military vehicles, rail vehicles, such as trains, and the like. Furthermore, it should be understood that vehicle may not just include land-based vehicles, but could also include aircraft and watercraft as well.

Connected to the first surface 14 of the vehicle structure 12 are a plurality of acoustic scatterers 18, which may be referred to as half scatterers in this disclosure. The plurality of acoustic scatterers 18 form an array. The acoustic scatterers 18 are separated from each other by a distance of d. It should be understood that the acoustic scatterers 18 and the first surface 14 may be a unitary structure or may utilize one of several different methodologies to connect the acoustic scatterers 18 to the first surface 14. In one example, the acoustic scatterers 18 may be adhered to the first surface 14 using an adhesive, but other types of methodologies to connect the acoustic scatterers 18 to the first surface 14 may be utilized, such as mechanical devices like screws, bolts, clips, and the like. Alternatively, the acoustic scatterers 18 and the vehicle structure 12 may be formed as a unitary structure. The acoustic scatterers 18 may be made of an acoustically hard material, such as concrete, metal, glass, wood, plastic, combinations thereof, and the like. In one example, the acoustic scatterers 18 may be made of the same material as the first surface 14 of the vehicle structure 12.

Each of the acoustic scatterers 18 have a resonant frequency. The resonant frequency of each of the acoustic scatterers 18 may be the same resonant frequency or may be different resonant frequencies. Sound absorbed by the sound absorbing structure 10, as will be explained later, substantially matches the resonant frequency of the acoustic scatterers 18. By utilizing acoustic scatterers having different resonant frequencies, a wider range of sounds with different frequencies can be absorbed by the sound absorbing structure 10.

In this example, a total of eight acoustic scatterers 18 are attached to the first surface 14 of the vehicle structure 12. However, it should be understood that any number of acoustic scatterers 18 may be utilized. In some examples, only one acoustic scatterer 18 may be utilized, while, in other examples, numerous acoustic scatterers 18 may be utilized.

As stated before, projected sound 20, which may also be referred to as a noise, may originate from any one of several different sources or combinations thereof. For example, the source of the projected sound 20 may originate from a speaker, vehicle, aircraft, watercraft, train, and the like. Again, it should be understood that the sound absorbing structure 10 can be used in any situation where it is desirable to eliminate or reduce sounds of certain frequencies. The incidence angle of sound waves, such as the projected sound 20, absorbed by the sound absorbing structure varies based on the distance between a plurality of acoustic scatterers 18.

As stated before, the projected sound 20 is at least partially reflected by the first surface 14 of the vehicle structure 12 without a phase change. The acoustic scatterers 18 behave like a monopole source at a certain distance from the first surface 14 of the vehicle structure 12, and its mirror image radiates a monopole moment as well. The two monopoles form a new plane wave having a direct reflection from the panel with a 180° phase difference. As such, the wave reflected by the first surface 14 of the vehicle structure 12 is essentially canceled out by the new plane wave, thus absorbing the projected sound.

The absorption performance of the sound absorbing structure 10 may be incident angle dependent. The sound absorbing structure 10 and acoustic scatterers 18 disclosed in this disclosure operate over a relatively wide range of incidence. Total absorption can still be achieved for 30-degree and 45-degree incidence. However, high order diffraction modes will start to propagate with the increase of the incident angle. This phenomenon will change the absorption performance. When the high order diffraction modes exist at the scatterer resonant frequency, and the incident angle is sufficiently large, then the sound absorbing structure 10 may not achieve total absorption. The disclosed design is tunable so that the spacing between acoustic scatterers 18 can be reduced, hence increasing the working angle.

Another benefit of the acoustic scatterer design disclosed in this disclosure is that the acoustic scatterers 18 are separated from each other, so there may be ample space to combine one design with another to cover more frequencies. For example, acoustic scatterers 18 with different resonant frequencies can be utilized to absorb and improve STL across a wider range of frequencies. The resonant frequency is tuned by adjusting the size of the acoustic scatterer 18 and the channel and/or cavity, as well as the width and length of the air channel. Different acoustic scatterer designs may then be combined to achieve broadband performance.

The space between the acoustic scatterers 18 of the sound absorbing structure 10 can be tuned. The benefit of tunable spacing is that one can choose between sparsity and the material's working angle. By reducing the space, the performance of the sound absorbing structure 10 will be less sensitive to the incident angle of the wave.

Figure 2A:
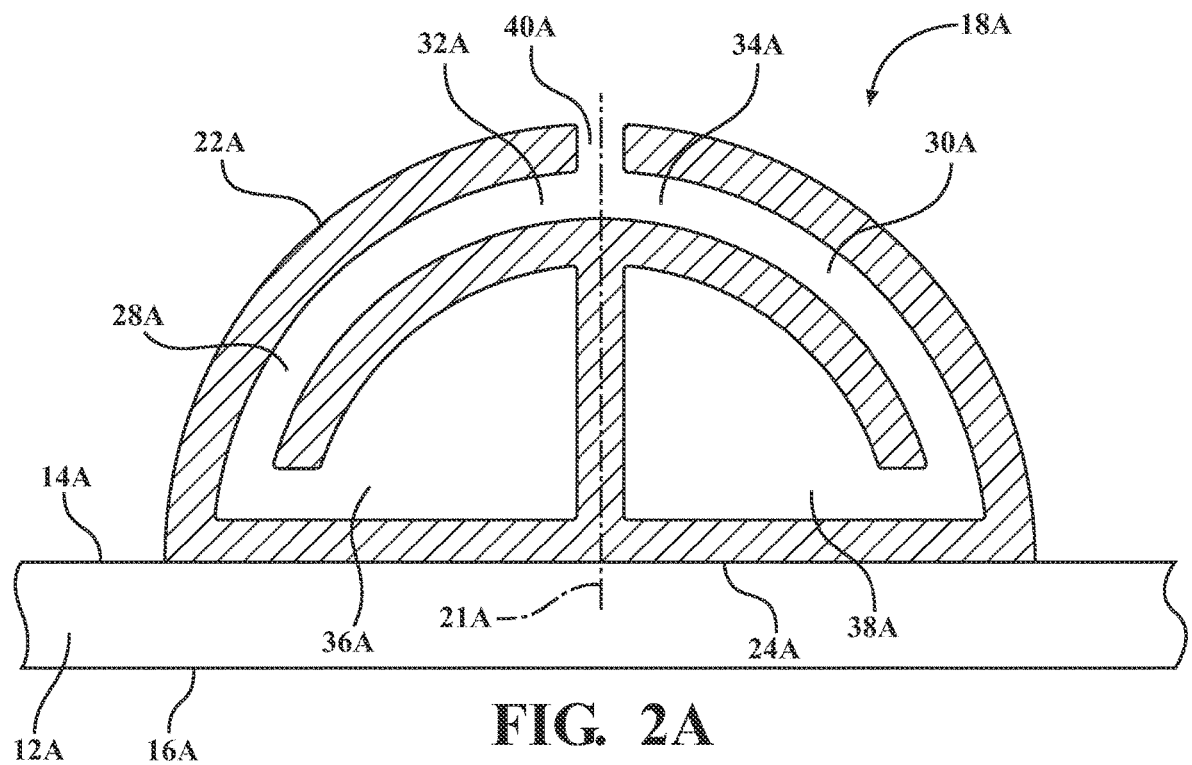
FIGS. 2A and 2B illustrate cross-sectional views, generally taken along lines 2-2 of FIG. 1, of different examples of scatters used by the sound absorbing structure of FIG. 1.

The acoustic scatterers 18 of FIG. 1 can take any one of several different forms. For example, FIG. 2A illustrates a cross-sectional view of one example of an acoustic scatterer 18A, generally taken along lines 2-2 of FIG. 1. This is just but one example of the design of the acoustic scatterer 18A. Here, the acoustic scatterer 18A is generally in the shape of a half-cylinder. The half-cylinder shape of the acoustic scatterer 18A includes a substantially semicircular portion 22A and a substantially flat portion 24A. The substantially flat portion 24A may be attached to the vehicle structure 12 shown in FIG. 1. Additionally, as stated before, the acoustic scatterer 18A and the vehicle structure 12 shown in FIG. 1 may be a unitary structure or may be connected to each other using the previously mentioned methodologies. It should be understood that the semicircular portion 22A may take any one of several different shapes. These shapes may be non-planar, but any suitable shape may be utilized.

The acoustic scatterer 18A may be made of any one of several different materials. Like before, the acoustic scatterer 18A may be made of an acoustically hard material, such as concrete, metal, glass, wood, plastic, combinations thereof, and the like. In one example, the acoustic scatterer 18A may be made of the same material as the vehicle structure 12A.

The overall shape of the acoustic scatterer 18A may be substantially uniform along the length of the acoustic scatterer 18A. In this example, the acoustic scatterer 18A may include a first channel 28A that has an open end 32A and a terminal end 36A. The acoustic scatterer 18A may also include a second channel 30A that has an open end 34A and a terminal end 38A. The open ends 32A and 34A may be in fluid communication with an opening 40A formed on the semicircular portion 22A of the acoustic scatterer 18A. The opening 40A may be directly adjacent to the open end 32A and/or the open end 34A. The opening 40A may be adjacent to a line of symmetry 21A of the acoustic scatterer 18A. As to the terminal ends 36A and 38A, these ends are separated from each other and are not in fluid communication with each other. The terminal ends 36A and 38A may terminate in any one of several different shapes. Moreover, the terminal ends 36A and 38A may terminate in the form of a chamber or may terminate in the form of a closed off channel.

The channels 28A and 30A may have a circumferential type shape that generally follows the circumference defined by the semicircular portion 22A. The opening 40A may have a substantially similar width to the width of the channels 28A and 30A. However, the widths of the channels may vary considerably.

The acoustic scatterer 18A may have a line of symmetry 21A. In this example, the shape of the first channel 28A is essentially a mirror image of the second channel 30A. In addition, the volumes of the channels 28A and 30A may be substantially equal. "Substantially equal" in this disclosure should be understood to indicate approximately a 10% difference in the overall volume or shape of the channels 28A and 30A. The resonant frequency of the channel(s) may be the same.

It should be understood that the number of channels and the shape of the channels can vary from application to application. In this example described, the acoustic scatterer 118A has two channels—channels 28A and 30A. However, more or fewer channels may be utilized. In the case of multiple channels, the additional channels may have a similar shape to each other with the same channel cross-section area and length and the same cavity volume, similar to the channels 28A and 30A shown.

Figure 2B:
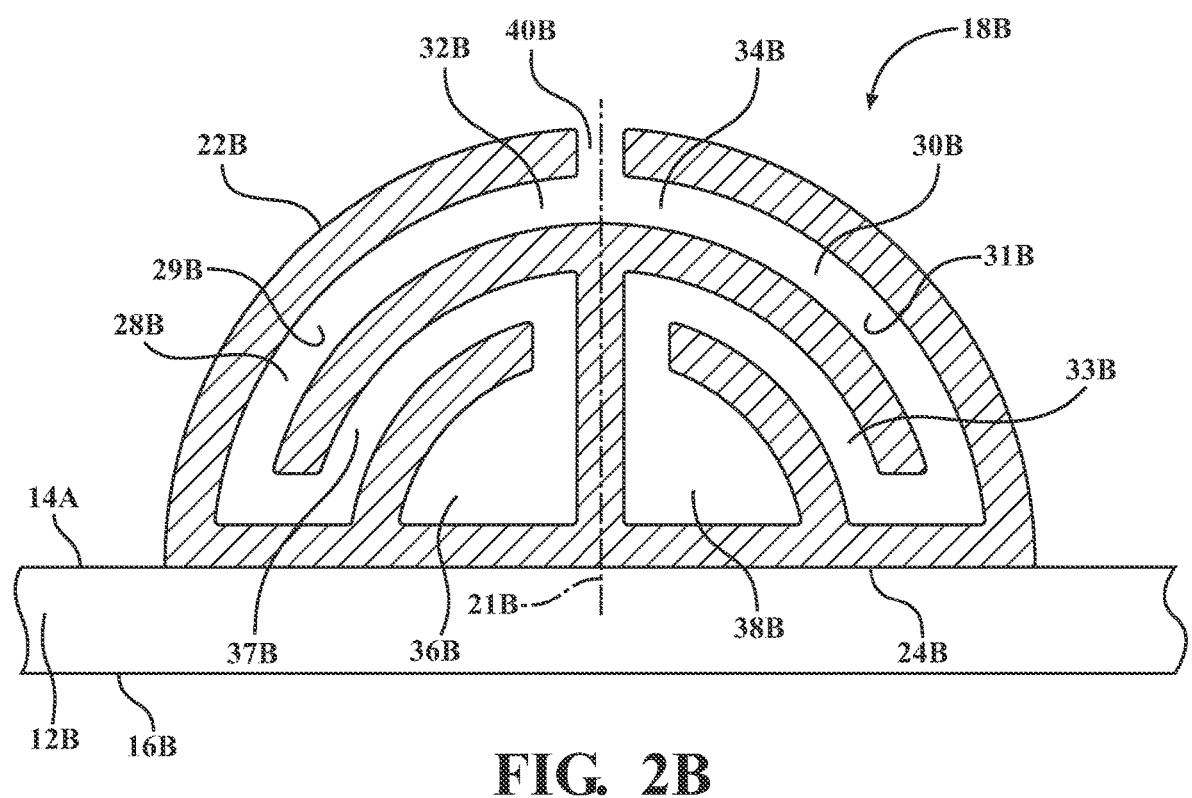

As stated before, the acoustic scatterers 18 of FIG. 1 can take any one of several different shapes. FIG. 2B illustrates another example of an acoustic scatterer 18B. Here, the acoustic scatterer 18B includes a first channel 28B and a second channel 30B. Both the first and second channels 28B and 30B have open ends 32B and 34B, respectively. Also, the first and second channels 28B and 30B have terminal ends 36B and 38B, respectively. The open ends 32B and 34B of the channels 28B and 30B may be in fluid communication with the opening 40B generally formed on the outer circumference 22B of the acoustic scatterer 18B. The opening 40B may be adjacent to a line of symmetry 21B of the acoustic scatterer 18B. The terminal ends 36B and 38B may be in the form of a chamber or may be in the form of a closed off channel.

Like before, the flat side 24B may be attached to the first surface 14B of the vehicle structure 12B by any one of several different methodologies mention. Additionally, like before, the acoustic scatterer 18B and the vehicle structure 12B may be a unitary structure.

In this example, the channel 28B is essentially a zigzag channel. Moreover, the channel 28B includes a first channel 29B and a second channel 37B that generally are parallel to one another and may have similar arcs. The second channel 30B is similar in that it has a first channel 31B and a second channel 33B that generally run parallel to each other and may have similar arcs. However, anyone of several different designs can be utilized.

The acoustic scatterer 18B may also have a line of symmetry 21B. As such, the first channel 28B may essentially be a mirror image of the second channel 30B Likewise, the volume of the first channel 28B may be substantially equal to the volume of the second channel 30B.

Figure 3:
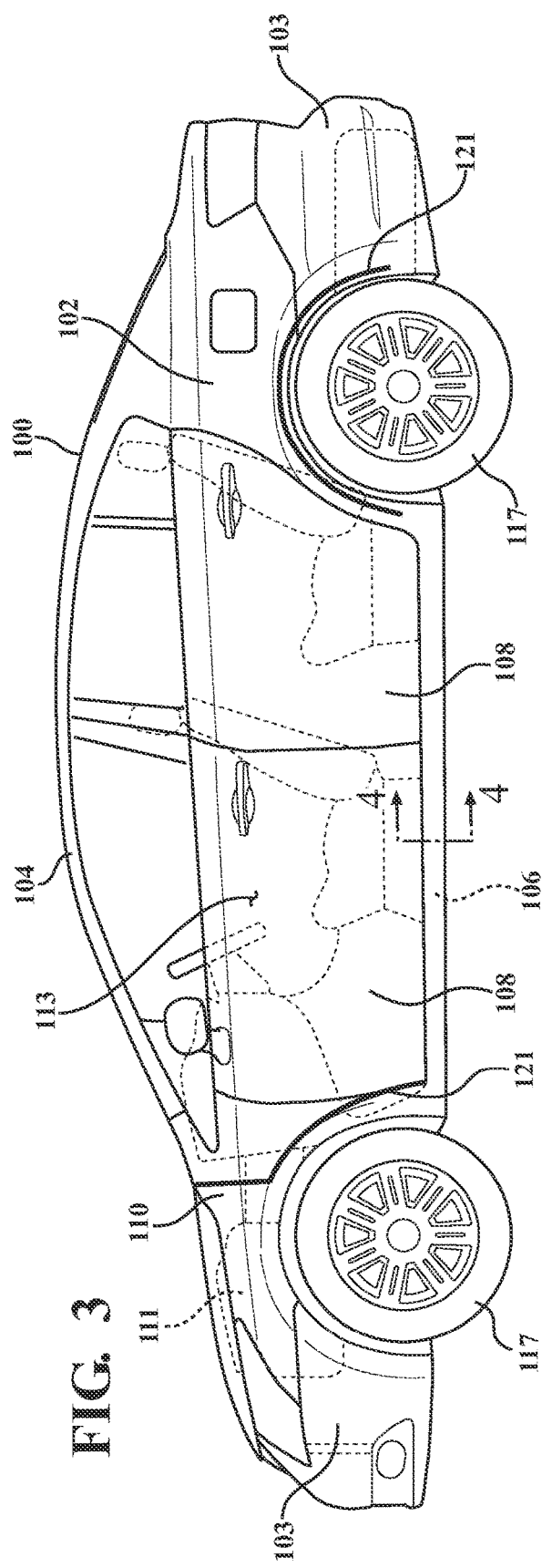
FIG. 3 illustrates different examples of the sound absorbing structures being used in a vehicle.

As stated before, the vehicle structure 12 of FIG. 1 could include any structure located in or on a vehicle. The vehicle could include any type of land, sea, or air-based form of powered transport. FIG. 3 illustrates one example of a vehicle 100. Here, the vehicle 100 is in the form of an automobile. The vehicle 100 includes numerous components, such as body panels 102, bumpers 103, a roof 104, door panels 108, floor panels 106, panels 110 that separate an engine 111 from a cabin 113 of the vehicle 100, and bodywork 121 that is located near the wheels 117. Any of these previously mentioned components may include one or more surfaces that may be made of an acoustically hard material. As such, any of these acoustically hard surfaces can be mounted with one or more acoustic scatterers, such as the acoustic scatterers 18 of FIG. 1. Furthermore, the vehicle 100 may also include other surfaces not mentioned above that may be made up of acoustically hard materials. These other unmentioned hard surfaces can also be candidates to be mounted with one or more acoustic scatterers, such as the acoustic scatterers 18 of FIG. 1.

Figure 4:
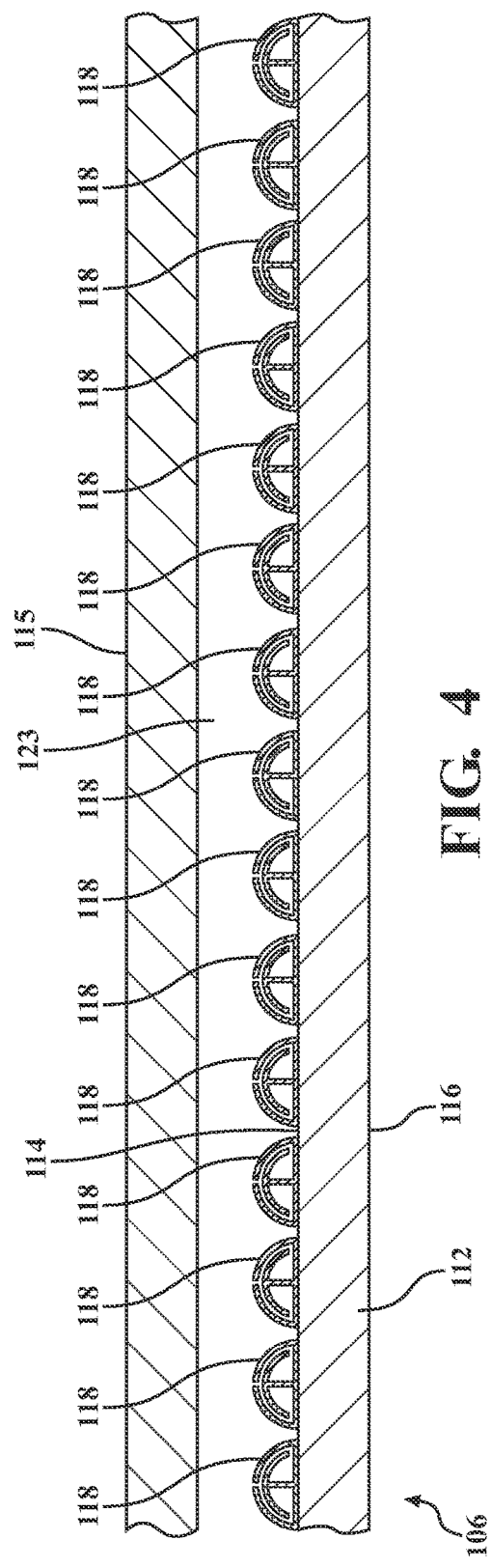
FIG. 4 illustrates a cross-sectional view, generally taken along lines 3-3 of FIG. 3, of an example vehicle structure incorporating one or more acoustic scatterers.

One example, shown in FIG. 4, illustrates the floor panel 106 of a vehicle, generally taken along lines 4-4 of FIG. 3. The floor panel 106 of the vehicle may include a first panel 112 and a second panel 115. The second panel 115 may be in the form of a floor pan that defines the floor of the cabin 113 of the vehicle 100 of FIG. 3. The second panel 115, being a floor pan, may be covered with trim as is the usual custom and many types of vehicles. Here, the first panel 112 and the second panel 115 define a space between 123. Located within the space between 123 may include one or more acoustic scatterers 118, which may be similar to the acoustic scatterers described in the previous figures.

Here, the space between 123 includes fifteen acoustic scatterers. The acoustic scatterers' size and shape may vary based on the frequency of the sound waves one wishes to minimize. As stated previously, each of the acoustic scatterers 118 have a resonant frequency. Sound waves of a substantially similar frequency, such as within 10%, to that of the resonant frequency of the acoustic scatterers 118 can generally be absorbed by the acoustic scatterers 118. In this example, the acoustic scatterers 118 are attached to a surface 114 of the first panel 112. The surface 114 of the first panel 112 generally faces towards the space between 123 defined between the first panel 112 and the second panel 115.

By placing the acoustic scatterers 118 in a space between 123 defined by a first panel 112 and the second panel 115, the acoustic scatterers 118 can essentially be protected from the elements while also providing sound absorbing capabilities. As such, sound projected towards the floor panel 106 of the vehicle 100 of FIG. 3 can be absorbed by the acoustic scatterers 118 of the floor panel 106.

Similar arrangements may be located in other locations as well. As such, the floor panel 106 of FIG. 4 and the arrangement of having the acoustic scatterers 118 sandwiched between the first panel 112 and the second panel 115 are equally applicable to other locations of the vehicle 100. For example, the first panel 112 and the second panel 115 may be utilized as a structure to define door panels 108, roof 104, panels 110 between the engine and the cabin, bumpers 103 and/or bodywork 121 near the wheels 117 as well. As such, the arrangement of the floor panel 106 utilizing two separate panels 112 and 115 can be equally applied to these situations as well.

Again, emphasis should be made that the vehicle structure could include any structure associated with the vehicle. In another example, illustrated in FIG. 5A, a muffler 200 for an exhaust of a vehicle, such as the vehicle 100 of FIG. 3 is shown. The muffler 200 may have an intake pipe 202 and output pipe 204 partially enclosed by a housing 206. Generally, the muffler 200 reduces noises generated by the exhaust gases as they exit the vehicle's engine. However, the sound absorbing capabilities of the muffler 200 can be improved by utilizing additional acoustic structures.

Figure 5A:
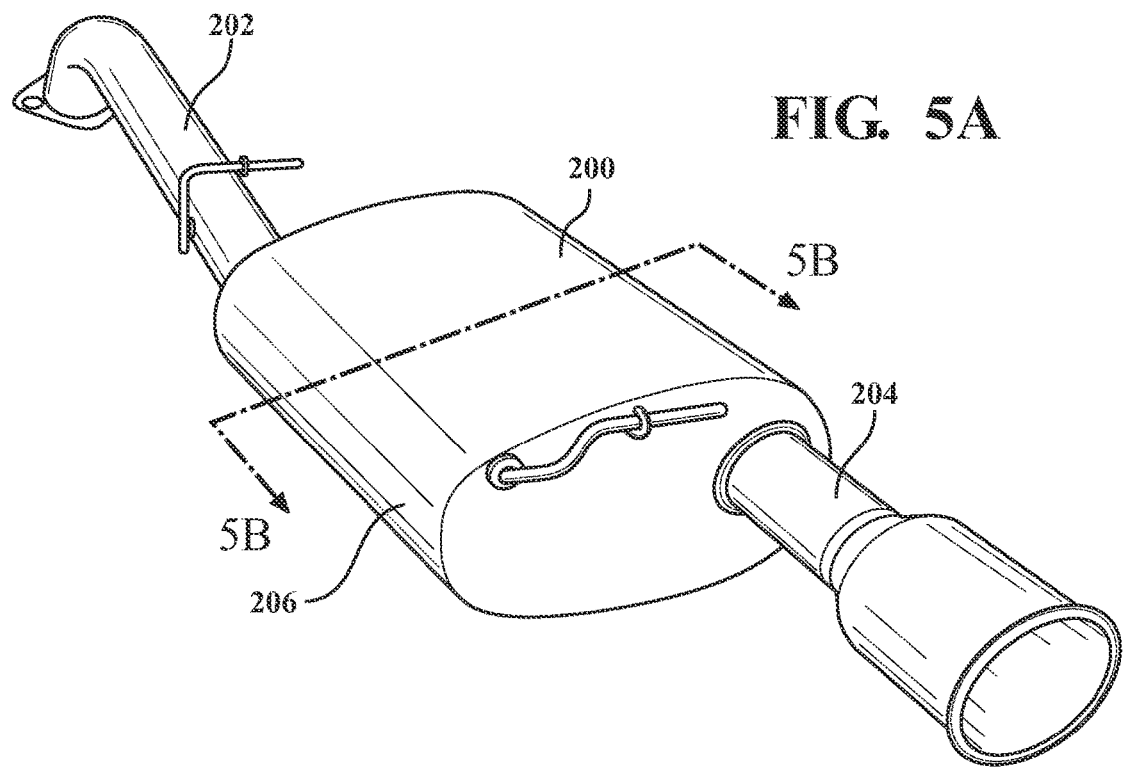
FIGS. 5A and 5B illustrate one example of a sound absorbing structure in the form of an exhaust muffler for a vehicle.
Figure 5B:
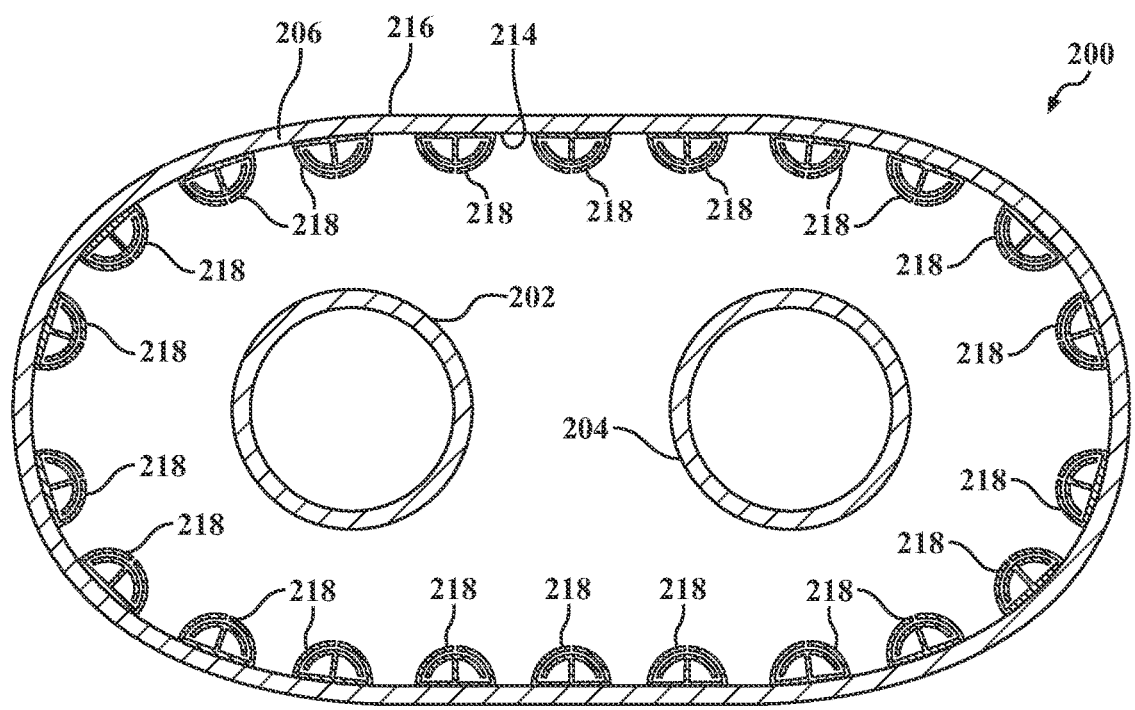

More specifically, referring to FIG. 5B, a cross-section, generally taken along lines 5-5 of the muffler 200 of FIG. 5A is shown. Here, the muffler 200 shows that the housing 206 includes an inside surface 214. The inside surface 214 of the housing 206 generally faces towards the interior of the muffler 200. The housing 206, and therefore the inside surface 214, may be made of an acoustically hard material, such as metal. One or more acoustic scatterers 218 may be mounted to the inside surface 214 of the housing 206 of the muffler 200. The acoustic scatterers 218 may be similar to the acoustic scatterers 18 of FIG. 1. The dimensions of the acoustic scatterers 218 may be such that they have a resonant frequency substantially similar to the frequency is of sound waves one wishes to absorb. Additional noise can be absorbed by placing additional acoustic scatterers 218 within the housing 206 of the muffler 200.

Figure 6:
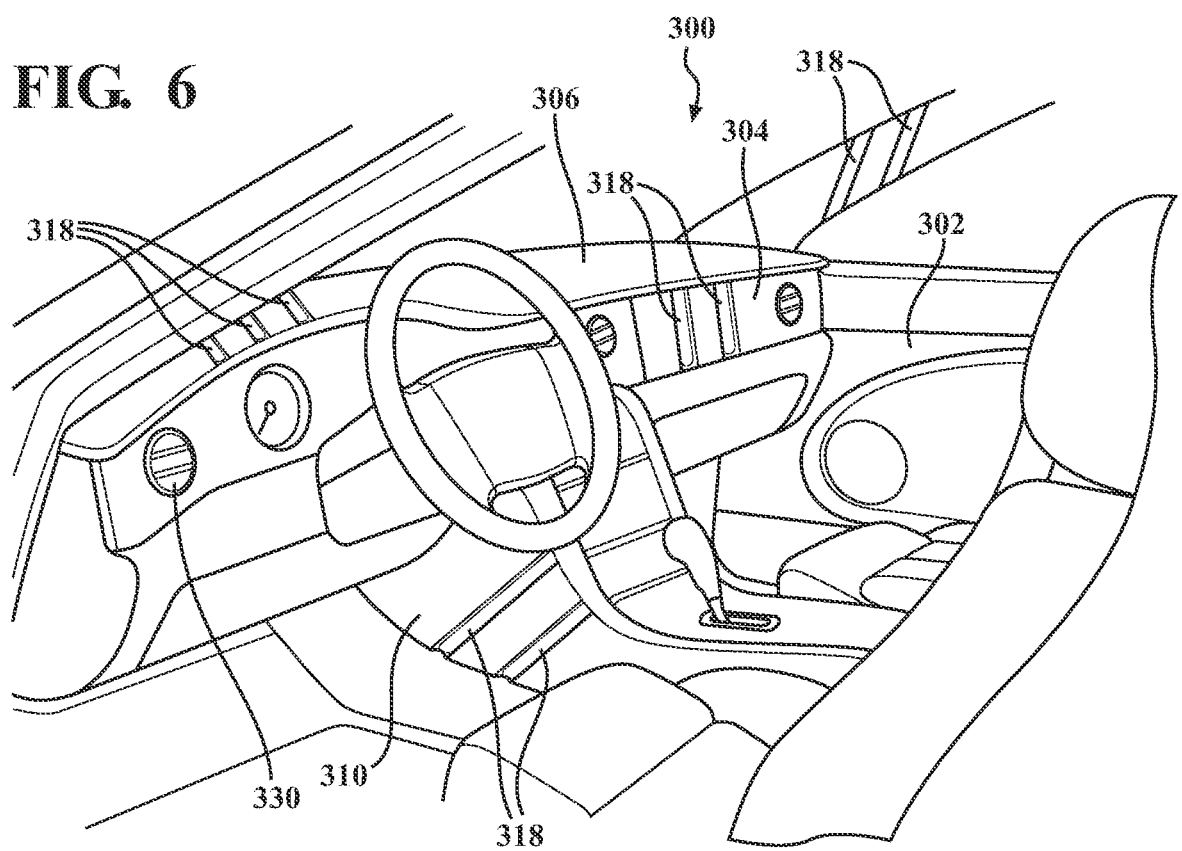
FIG. 6 illustrates one example of a sound absorbing structure being used within the interior of a vehicle.

Acoustic scatterers, such as the acoustic scatterers 18 similar to that of FIG. 1 can also be placed within a vehicle's cabin. For example, referring to FIG. 6, a cabin 300 of a vehicle, such as the vehicle 100 of FIG. 3, is shown. Located within the cabin 300 are numerous surfaces that may be made of a material that is acoustically hard. These surfaces can include the surfaces formed by a trim panel 302, 304, and/or 310. For example, the trim panel 302 is located on a door of a vehicle, while the trim panels 302 and/or 310 may be located more interior to the cabin 300 of the vehicle. Other surfaces can include surfaces formed by a dashboard 306. Again, it should be understood that any surface located within the cabin 300 of the vehicle may be utilized. As such, acoustic scatterers 318, similar to the acoustic scatterer 18 of FIG. 1 may be mounted on any of these panels 302, 304, and/or 310 and/or the dashboard 306.

In addition to being located within the cabin 300 of the vehicle, the cabin 300 of the vehicle also illustrates a vent 330. The vent 330 may be in fluid communication with a 332 that guides air from either the environment or from an HVAC system to the vent 330, which then can be adjusted by an occupant of the vehicle as desired.

Figure 7:
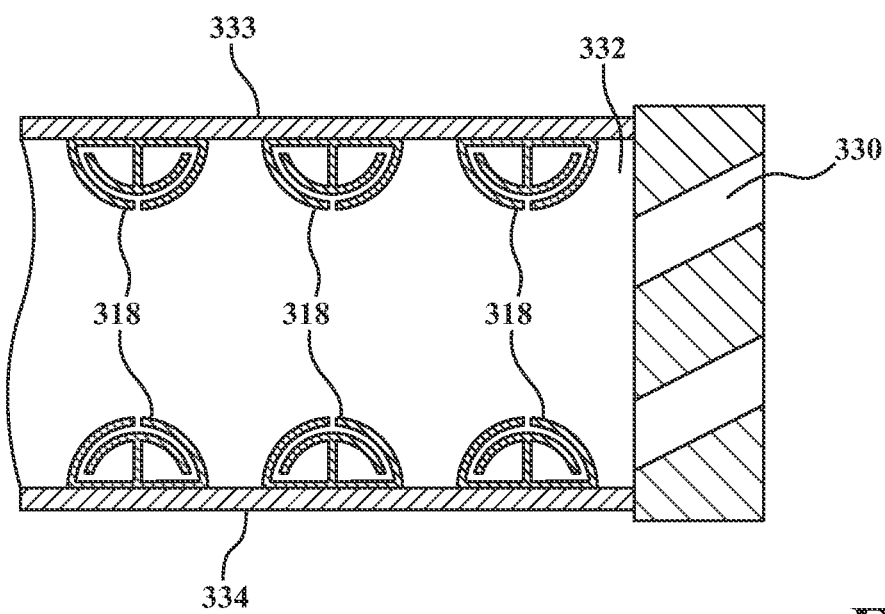
FIG. 7 illustrates one example of the sound absorbing structure being utilized within a duct of a vehicle.

As best shown in FIG. 7 a cutaway view of a duct 332, including the vent 330, is shown. Here, the duct 332 includes one or more sidewalls 333 and 334. Mounted to the sidewalls 333 and/or 334 may be one or more acoustic scatterers 318 Like before, the acoustic scatterers 318 may be similar to the acoustic scatter 18 of FIG. 1 but is sized and shaped to fit within the duct 332 of the vehicle. The one or more sidewalls 333 and 334 may be made of an acoustically hard material. As such, noise caused by air movement through the duct 332, or otherwise directed to the duct 332, may be absorbed by the one or more acoustic scatterers 318 located within the duct 332.

The example of the duct 332 given above is a duct used to guide air to the cabin 300 of a vehicle. However, the purpose of the duct 332 does not impact the use of one or more acoustic scatterers 318 located within the duct 332. As such, the duct 332, instead of guiding air to the cabin 300 of the vehicle, can be utilized to guide air to or from other components, such as an engine or exhaust system of the vehicle.

The preceding description is merely illustrative and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should also be understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A sound absorbing structure comprising:
   a vehicle structure having a surface;
   at least one acoustic scatterer coupled to the surface, the at least one acoustic scatterer having a resonant frequency;
   the at least one acoustic scatterer having an opening and a plurality of channels;
   the plurality of channels each have a channel open end and a channel terminal end, the channel open end being in fluid communication with the opening; and
   wherein the plurality of channels extend parallelly along the length of the at least one acoustic scatterer and the volumes of each of the plurality of channels are substantially equal to each other.

2. The sound absorbing structure of claim 1, wherein:
   the plurality of channels includes-a first channel and a second channel;
   the first channel has a first channel open end and a first channel terminal end, the first channel open end being in fluid communication with the opening;
   the second channel has a second channel open end and a second channel terminal end, the second channel open end being in fluid communication with the opening; and
   wherein the first channel terminal end and the second channel terminal end are separate from one another.

3. The sound absorbing structure of claim 1, wherein the at least one acoustic scatterer has a flat side, the flat side being coupled to the surface.

4. The sound absorbing structure of claim 3, wherein the at least one acoustic scatterer has a non-planar side, the non-planar side having the opening.

5. The sound absorbing structure of claim 4, wherein the at least one acoustic scatterer has a half-cylinder shape, the half-cylinder shape defining the non-planar side and the flat side.

6. The sound absorbing structure of claim 1, wherein the plurality of channels are-shaped in a zigzag design.

7. The sound absorbing structure of claim 1, wherein a thickness of the sound absorbing structure has a thickness of approximately $1/16$ of a wavelength of a sound wave absorbed by the sound absorbing structure.

8. The sound absorbing structure of claim 1, wherein the at least one acoustic scatterer comprises a plurality of acoustic scatters.

9. The sound absorbing structure of claim 8, wherein the plurality of acoustic scatters includes a first scatterer having a first resonant frequency and a second scatterer having a second resonant frequency.

10. The sound absorbing structure of claim 1, wherein the sound absorbing structure is configured to absorb sound waves at a certain frequency generated by a source of a noise, wherein the certain frequency is substantially similar to the resonant frequency of the at least one acoustic scatterer.

11. The sound absorbing structure of claim 10, wherein the sound absorbing structure is configured to absorb sound waves generated by a source of a noise and projected towards the sound absorbing structure at an incidence angle substantially between 0 degrees and 45 degrees.

12. The sound absorbing structure of claim 11, wherein:
    the at least one acoustic scatterer includes a plurality of acoustic scatterers separate from each other by a distance; and
    wherein the incidence angle of the sound waves absorbed by the sound absorbing structure varies based on a distance between a plurality of acoustic scatterers.

13. The sound absorbing structure of claim 12, the incidence angle of the sound waves absorbed by the sound absorbing structure increases as a distance between the plurality of acoustic scatterers decreases.

14. The sound absorbing structure of claim 1, wherein the vehicle structure is made of a rigid material.

15. The sound absorbing structure of claim 14, wherein the vehicles structure is at least one of: a vehicle body panel, a vehicle hood, a vehicle interior panel, a housing of a muffler, a duct, a floor pan, a trim piece, and a roof.

16. A vehicle structure comprising;
    a first panel and a second panel that defines a space between the first panel and the second panel;
    at least one acoustic scatterer coupled to a side of the first panel and located in the space between the first panel and the second panel, the at least one acoustic scatterer having a resonant frequency;
    the at least one acoustic scatterer having an opening and a plurality of channels; and wherein the plurality of channels each have a channel open end and a channel terminal end, the channel open end being in fluid communication with the opening; and wherein the plurality of channels extend parallelly along the length of the at least one acoustic scatterer and the volumes of each of the plurality of channels are substantially equal to each other.

17. The vehicle structure of claim 16, wherein:

the plurality of channels includes a first channel and a second channel;

the first channel has a first channel open end and a first channel terminal end, the first channel open end being in fluid communication with the opening;

the second channel has a second channel open end and a second channel terminal end, the second channel open end being in fluid communication with the opening; and wherein the first channel terminal end and the second channel terminal end are separate from one another.

18. The vehicle structure of claim 16, wherein the at least one acoustic scatterer has a flat side and a non-planar side, the flat side being coupled to the side of the first panel and the non-planar side having the opening.

19. The vehicle structure of claim 16, wherein the at least one acoustic scatterer is configured to absorb sound waves at a certain frequency generated by a source of a noise, wherein the certain frequency is substantially similar to the resonant frequency of the at least one acoustic scatterer.

20. The vehicle structure of claim 16, wherein:

the at least one acoustic scatterer includes a plurality of acoustic scatterers separate from each other by a distance; and wherein an incidence angle of sound waves absorbed by the plurality of acoustic scatterers varies based on a distance between a plurality of acoustic scatterers.

* * * * *